United States Patent
Salek et al.

(10) Patent No.: US 12,341,763 B2
(45) Date of Patent: *Jun. 24, 2025

(54) GENERATING BRIDGE MATCH IDENTIFIERS FOR LINKING IDENTIFERS FROM SERVER LOGS

(71) Applicant: GOOGLE LLC, Mountain View, CA (US)

(72) Inventors: Mahyar Salek, San Jose, CA (US); Philip McDonnell, Belmont, CA (US); Vinod Kumar Ramachandran, Sunnyvale, CA (US); Shobhit Saxena, Sunnyvale, CA (US); David Owen Shanaha, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 427 days.

This patent is subject to a terminal disclaimer.

(21) Appl. No.: 17/840,588

(22) Filed: Jun. 14, 2022

(65) Prior Publication Data

US 2022/0311754 A1 Sep. 29, 2022

Related U.S. Application Data

(63) Continuation of application No. 16/843,553, filed on Apr. 8, 2020, now Pat. No. 11,363,006, which is a
(Continued)

(51) Int. Cl.
*H04L 9/40* (2022.01)
*G06F 21/62* (2013.01)

(52) U.S. Cl.
CPC .......... *H04L 63/06* (2013.01); *G06F 21/6254* (2013.01); *H04L 63/068* (2013.01)

(58) Field of Classification Search
CPC .... H04L 63/06; H04L 63/068; G06F 21/6254
(Continued)

(56) References Cited

U.S. PATENT DOCUMENTS

| 3,468,119 A | 9/1969 | Kumar et al. |
| 4,868,119 A | 9/1989 | Clark |

(Continued)

FOREIGN PATENT DOCUMENTS

| CN | 101022377 A | 8/2007 |
| CN | 101562636 A | 10/2009 |

(Continued)

OTHER PUBLICATIONS

Kim et al., The 7th International Conference for Internet Technology and Secured Transactions (ICITST-2012), "User-Intent Custom Adaptive Search Service based on Ontology and Similar-Word Retrieval Algorithm Composition", pp. 119-374 (Year: 2012).*

(Continued)

*Primary Examiner* — Khalil Naghdali
(74) *Attorney, Agent, or Firm* — MARSHALL, GERSTEIN & BORUN LLP

(57) ABSTRACT

Systems and methods of matching identifiers between multiple datasets are described herein. A system can transmit a first identifier vector to a third party server. The first identifier vector can include a first identifier, first parameters, and second parameters. The system can receive, from the third party server, the first identifier vector encrypted based on a third-party encryption. The system can receive, from the third party server, a second identifier vector encrypted based on the third-party encryption associated with the third party server. The second identifier vector can include a second identifier, third parameters, and fourth parameters. The system can determine a correlation count between the first identifier vector and the second identifier vector. The system (Continued)

can determine that the first identifier corresponds to the second identifier based on the correlation count. The system can generate one identifier key for both the first identifier and the second identifier.

20 Claims, 4 Drawing Sheets

Related U.S. Application Data continuation of application No. 16/216,768, filed on Dec. 11, 2018, now Pat. No. 10,652,221, which is a continuation of application No. 15/650,099, filed on Jul. 14, 2017, now Pat. No. 10,182,042, which is a continuation of application No. 14/808,634, filed on Jul. 24, 2015, now Pat. No. 9,716,697.

(58) Field of Classification Search
USPC ......................................................... 713/150
See application file for complete search history.

(56) References Cited

U.S. PATENT DOCUMENTS

| | | | |
|---|---|---|---|
| 6,952,769 | B1 | 10/2005 | Dubey et al. |
| 8,429,086 | B2 | 4/2013 | Babitch |
| 8,468,119 | B2 | 6/2013 | Kumar et al. |
| 8,572,379 | B2 | 10/2013 | Cancedda |
| 8,621,240 | B1 | 12/2013 | Auchmoody et al. |
| 8,634,853 | B2 | 1/2014 | Bogatin |
| 8,745,390 | B1 | 6/2014 | Atwood et al. |
| 9,305,070 | B2 | 4/2016 | Zhu et al. |
| 9,349,026 | B2 | 5/2016 | Gianniotis |
| 9,716,697 | B2 | 7/2017 | Salek et al. |
| 10,142,296 | B2 | 11/2018 | Salek et al. |
| 10,652,221 | B2 | 5/2020 | Salek et al. |
| 11,363,006 | B2 | 6/2022 | Salek et al. |
| 2006/0077095 | A1 | 4/2006 | Tucker et al. |
| 2007/0038674 | A1 | 2/2007 | Bejar |
| 2009/0037492 | A1 | 2/2009 | Baitalmal |
| 2009/0132805 | A1 | 5/2009 | Ginter et al. |
| 2010/0014657 | A1 | 1/2010 | Kerschbaum et al. |
| 2010/0318858 | A1 | 12/2010 | Essawi |
| 2011/0141967 | A1 | 6/2011 | Lane |
| 2012/0016899 | A1 | 1/2012 | Kumar et al. |
| 2012/0191614 | A1 | 7/2012 | Babitch et al. |
| 2012/0330722 | A1 | 12/2012 | Volpe et al. |
| 2013/0251150 | A1 | 9/2013 | Chassagne |
| 2013/0326220 | A1 | 12/2013 | Connelly et al. |
| 2014/0006097 | A1 | 1/2014 | Groarke |
| 2015/0128285 | A1 | 5/2015 | LaFever |
| 2015/0128287 | A1 | 5/2015 | LaFever |
| 2015/0149763 | A1 | 5/2015 | Kamara |
| 2017/0161521 | A1 | 6/2017 | Fontecchio |
| 2017/0170960 | A1 | 6/2017 | Shaked |
| 2018/0307859 | A1 | 10/2018 | LaFever |

FOREIGN PATENT DOCUMENTS

| | | |
|---|---|---|
| CN | 103581309 A | 2/2014 |
| GB | 2 469 673 A | 10/2010 |
| JP | 2008-225988 A | 9/2008 |
| JP | 2014-092882 A | 5/2014 |
| JP | 2015-503148 A | 1/2015 |
| WO | WO-2014/050027 A1 | 4/2014 |

OTHER PUBLICATIONS

Guo et al., 2013 IEEE, 5th International Conference on Intelligent Networking and Collaborative Systems, "Design of a Security Framework on MapReduce", pp. 139-145 (Year: 2013).*

Agrawal et al., "Information Sharing Across Private Databases," Sigmod 2003, Proceedings of the ACM Sigmod International Conference on management of Data, San Diego, CA, dated Jun. 9-12, 2003 (12 pages).
Berthier et al., "On the Practicality of Detecting Anomalies with Encrypted Traffic in AMI", 2014 IEEE International Conference on Smart GridCommunications, pp. 890-895 (Year: 2014).
Clifton et al., "TopCat: Data Mining for Topic Identification in a Text Corpus," IEEE Transactions on Knowledge and Data Engineering, IEEE Service Center, Los Alamitos, CA, vol. 15, No. 8, dated Aug. 1, 2004 (10 pages).
Clifton, C. et al., "TopCat: Data Mining for Topic Identification in a Text Corpus," IEEE Transactions on Knowledge and Data Engineering, IEEE Service Center, Los Alamitos, CA, vol. 15, No. 8, dated Aug. 1, 2004 (10 pages).
Decision to Grant a Patent for EP Appln. Ser. No. 16745586.4 dated Aug. 7, 2019 (73 pages).
Decision to Grant a Patent for JP Appln. Ser. No. 2017-556894, dated Dec. 17, 2018 (2 pages).
Decision to Grant on EP Appln. Ser. No. 16745586.4 dated Aug. 7, 2019 (73 pages).
Examination Report for EP Appln. Ser. No. 16745320.8 dated Oct. 30, 2019 (5 pages).
Examination Report for EP Appln. Ser. No. 16745320.8 dated Sep. 9, 2020 (3 pages).
Examination Report for IN Appln. Ser. No. 201847002014 dated Oct. 16, 2020 (10 pages).
Examination Report for IN Appln. Ser. No. 201847002015 dated Feb. 15, 2021 (5 pages).
First Office Action for CN Appln. Ser. No. 201680003790.6 dated Sep. 19, 2019 (17 pages).
First Office Action for CN Appln. Ser. No. 201680003807.8 dated Sep. 2, 2019 (11 pages).
First Office Action for CN Appln. Ser. No. 202010644421.3 dated Feb. 24, 2021 (10 pages).
International Preliminary Report of Patentability, Ch. I, for PCT Appln. Ser. No. PCT/US2016042925 dated Feb. 8, 2018 (8 pages).
International Preliminary Report on Patentability, Ch. I, for PCT Appln. Ser. No. PCT/US2016042921 dated Feb. 8, 2018 (7 pages).
International Search Report and the Written Opinion of the International Searching Authority for PCT Application PCT/US2016/042925 dated Oct. 6, 2016, 29 pages.
International Search Report and Written Opinion for PCT Appln. Ser. No. PCT/US2016/042921 dated Sep. 29, 2016 (10 pages).
International Search Report and Written Opinion for PCT Appln. Ser. No. PCT/US2016/042925 dated Oct. 6, 2016 (11 pages).
International Search Report and Written Opinion for related PCT application No. PCT/US2016/042921, dated Sep. 29, 2016.
Non-Final Office Action for KR Appln. Ser. No. 10-2017-7031639 dated May 14, 2019 (8 pages).
Non-Final Office Action for U.S. Appl. No. 14/808,634 dated Dec. 22, 2016 (25 pages).
Non-Final Office Action for U.S. Appl. No. 15/650,099 dated Oct. 25, 2017 (14 pages).
Non-Final Office Action for U.S. Appl. No. 16/216,768 dated May 7, 2019 (10 pages).
Non-Final Office Action on CN Appln. Ser. No. 201680003807.8 dated Sep. 2, 2019 (11 pages).
Non-Final Office Action on KR Appln. Ser. No. 10-2017-7031188 dated Jun. 12, 2019 (14 pages).
Non-Final Office Action on KR Appln. Ser. No. 10-2017-7031639, dated May 14, 2019 (8 pages).
Notice of Allowance for KR Appln. Ser. No. 10-2017-7031188 dated Oct. 10, 2019 (3 pages).
Notice of Allowance for KR Appln. Ser. No. 10-2017-7031639 dated Oct. 1, 2019 (3 pages).
Notice of Allowance for U.S. Appl. No. 14/808,634 dated Mar. 31, 2017 (9 pages).
Notice of Allowance for U.S. Appl. No. 15/043,394 dated Jul. 31, 2018 (12 pages).
Notice of Allowance for U.S. Appl. No. 15/043,394 dated Mar. 27, 2018 (14 pages).
Notice of Allowance for U.S. Appl. No. 15/650,099 dated Jan. 23, 2018 (12 pages).

(56) References Cited

OTHER PUBLICATIONS

Notice of Allowance for U.S. Appl. No. 15/650,099 dated Jul. 6, 2018 (8 pages).
Notice of Allowance for U.S. Appl. No. 16/216,768 dated Aug. 14, 2019 (11 pages).
Notice of Allowance for U.S. Appl. No. 16/216,768 dated Jan. 13, 2020 (9 pages).
Notice of Allowance on KR Appln. Ser. No. 10-2017-7031188 dated Oct. 10, 2019 (3 pages).
Notice of Allowance on KR Appln. Ser. No. 10-2017-7031639 dated Oct. 1, 2019 (3 pages).
Notice of Allowance on U.S. Appl. No. 15/043,394 dated Jul. 31, 2018.
Notice of Allowance on U.S. Appl. No. 15/650,099 dated Jul. 6, 2018.
Office Action for KR Appln. Ser. No. 10-2017-7031188 dated Jun. 12, 2019 (14 pages).
Office Action on CN Appln. Ser. No. 201680003790.6 dated Sep. 19, 2019 (17 pages).
Office Action on EP Appln. Ser. No. 16745320.8 dated Oct. 30, 2019 (5 pages).
U.S. Notice of Allowance on U.S. Appl. No. 15/650,099 dated Jan. 23, 2018.
U.S. Notice of Allowance on U.S. Appl. No. 14/808,634 dated Mar. 31, 2017.
U.S. Notice of Allowance on U.S. Appl. No. 15/043,394 dated Mar. 27, 2018.
U.S. Office Action on U.S. Appl. No. 14/808,634 dated Dec. 22, 2016.
U.S. Office Action on U.S. Appl. No. 15/650,099 dated Oct. 25, 2017.
Urbina et al., 2014 IEEE International Conference on Smart Grid Communications, "On the Practicality of Detecting Anomalies with Encrypted Traffic in AMI", pp. 890-895 (Year: 2014).
Written Opinion of the International Searching Authority for application No. PCT/US2016042921.
Written Opinion of the International Searching Authority for application No. PCT/US2016042925.

\* cited by examiner

GENERATING BRIDGE MATCH IDENTIFIERS FOR LINKING IDENTIFERS FROM SERVER LOGS

BACKGROUND

In a computer networked environment such as the Internet, entities such as people or companies can provide information for public display on online content through web servers. When a client device sends requests for online content to the entity's various web servers and receives online content from the entity's respective web server, the web server can maintain a log of such computing device network activity and interactions according to various formats.

SUMMARY

At least one aspect is directed to a method of matching identifiers between multiple datasets. The method can include transmitting a first identifier vector to a third party server. The first identifier vector can include a first identifier, a plurality of first parameters, and a plurality of second parameters. The method can include receiving the first identifier vector encrypted based on a third-party encryption associated with the third party server. The method can include receiving, from the third party server, a second identifier vector encrypted based on the third-party encryption associated with the third party server. The second identifier vector can include a second identifier, a plurality of third parameters, and a plurality of fourth parameters. The method can include determining a correlation count between the first identifier vector and the second identifier vector based on a match between some of the plurality of first parameters and some of the plurality of the third parameters and between some of the plurality of the second parameters and some of the plurality of fourth parameters. The method can include determining that the first identifier corresponds to the second identifier based on the correlation count between the first identifier vector and the second identifier vector being above a determined threshold. The method can include generating, responsive to determining that the first identifier corresponds to the second identifier, one identifier key for both the first identifier and the second identifier At least one aspect is directed to system for matching identifiers between multiple datasets. The system can include a data processing system, comprising a mapping module. The data processing system can transmit a first identifier vector to a third party server. The first identifier vector can include a first identifier, a plurality of first parameters, and a plurality of second parameters. The data processing system can receive from the third party server, the first identifier vector encrypted based on a third-party encryption associated with the third party server. The data processing system can receive a second identifier vector, encrypted based on the third-party encryption associated with the third party server. The second identifier vector can include a second identifier, a plurality of third parameters, and a plurality of fourth parameters. The data processing system can determine a correlation count between the first identifier vector and the second identifier vector based on a match between some of the plurality of first parameters and some of the plurality of the third parameters and between some of the plurality of the second parameters and some of the plurality of fourth parameters. The data processing system can determine that the first identifier corresponds to the second identifier based on the correlation count between the first identifier vector and the second identifier vector being above a determined threshold. The data processing system can generate, responsive to determining that the first identifier corresponds to the second identifier, one identifier key for both the first identifier and the second identifier.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

Like reference numbers and designations in the various drawings indicate like elements.

DETAILED DESCRIPTION

Figure 1:
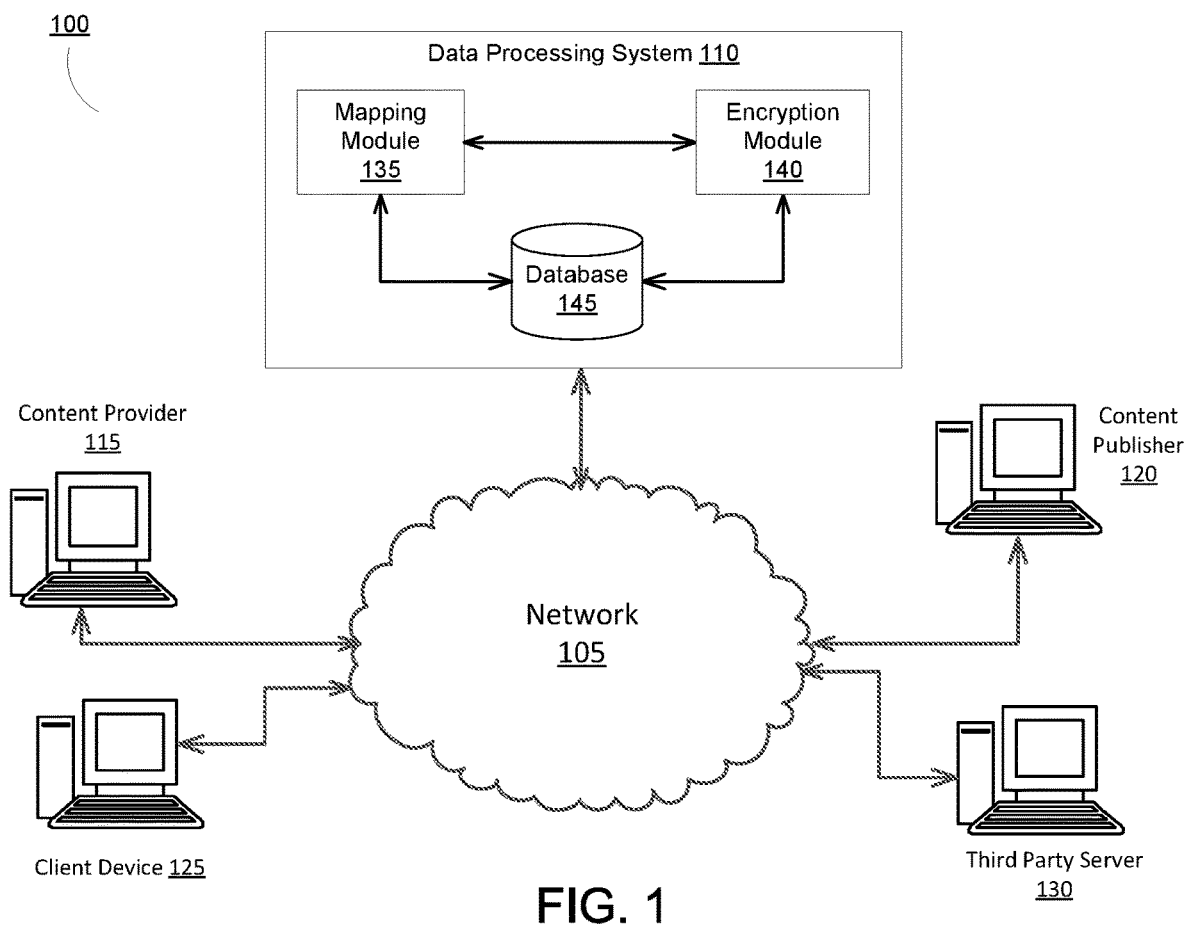
FIG. 1 is a block diagram depicting one example computer networked environment to match identifiers between different datasets, according to an illustrative implementation.

Following below are more detailed descriptions of various concepts related to, and implementations of, methods, apparatuses, and systems of matching identifiers between different datasets. Online and offline interactions by the same entity may be logged by various parties differently. For example, each of the various parties can keep track of these interactions using different identifiers and encryption techniques.

The systems and methods described herein can map identifiers between different datasets stored by the various parties using different identifiers and encryption techniques. For example, a computing device can access an online document (e.g., a webpage) that includes content items (e.g., advertisements), and a user of the computing device can click on or convert the content item to access a landing page indicated by or associated with the content item. A content publisher computing device can identify this interaction using the publisher's own identifier and encryption techniques. A content item provider computing device can also identify transactions using the content item provider's own identifier and encryption techniques. As such, the webpage or other content publisher may not have information indicating how the content item provider identifies a computing device, and vice versa. Moreover, the content publisher entity (e.g., website owner) and the content item provider entity (e.g., advertiser) may not wish to transmit proprietary or confidential information without taking precautions.

Using for example blind encryption techniques, the systems and methods described herein can allow various parties to determine the correlation between their respective identifiers encrypted using different encryption techniques. A first party server and a third party server (e.g., a computing system with one or more processors) can encrypt received identifier vectors that contain log data of the computing device interactions, and exchange the encrypted identifier vectors. A computing device interaction can include, for example, requests for online content from the server, visits to a websites, and computing device identifier authentication, or any other activity between the computing device and the server. Using the exchanged and encrypted identifier vectors, the first party server or the third party server can determine which of the other identifiers correspond to their identifiers, and generate an identifier key for each of the respective identifiers.

For example, the first party server can transmit an identifier vector to a third party server. The first party identifier vector can include an encryption of a first party identifier, a set of first parameters, and a set of second parameters. The first party identifier vector can also include an encryption of the first party identifier and a set of keys based on a combination of the respective first parameter and the respective second parameter. The first party identifier can include a device identifier associated with a particular client device and an account identifier associated with the a profile, address, or account, for example. The key based on the combination of the respective first parameter and the respective second parameter can be generated by a hash function. Each of the first parameters and second parameters can be a part of a log row entry specifying, for example, the location and time of the corresponding logged computing device interaction.

Having transmitted the first party identifier vector from the first party server, the first party server can receive the first party identifier vector encrypted by the encryption algorithm of the third party server back from the third party server. In addition, the first party server can receive another identifier vector from the third party server based on the log data of the third party server. The third party identifier vector can include an encryption of a third party identifier, a set of third parameters, and a set of fourth parameters. The third party identifier vector can also include an encryption of third party identifier and a set of key based on a combination of the respective third parameter and the respective fourth parameter. The identifier used by the third party may be different from the identifier used by the first party server. The encryption applied by the third party server may be different from the encryption applied by the first party server. The third parameter can correspond to the same type of log information as the first parameter. The fourth parameter can correspond to the same type of log information as the third parameter. Each of the third parameters and fourth parameters can include also a log row entry specifying, for example, the location and time of the corresponding logged computing device interaction.

After receiving the identifier vector based on the third party server log data, the first party server can apply its own encryption algorithm to the received identifier vector. Now having both sets of identifier vectors, the first party server can determine a correlation or mapping of the identifiers based on the matches between the first parameters and the third parameters and between the second parameters and the fourth parameters. For example, the first parameter and third parameter include location information about a user interaction and the second parameter and the fourth parameter include time information about the user interaction. In this example, The first party server can determine that there is a match between the respective parameters, when they are within a defined threshold distance and time frame. The first party server can determine that the identifiers correspond to each other, when the number of such matches are above a defined threshold. Using this correspondence, the first party server can generate a bridge or match identifier key. The bridge or match identifier key can then be used in a number of applications. For example, a content provider computing device or a content publisher computing device can use the key to determine a conversion rate among various online and offline interactions.

FIG. 1 is a block diagram depicting one example computer networked environment 100 to match identifiers between different datasets, according to an illustrative implementation. The network 105 can include computer networks such as the internet, local, wide, metro or other area networks, intranets, satellite networks, other computer networks such as voice or data mobile phone communication networks, and combinations thereof. The system 100 can also include at least one data processing system 110, e.g., at least one logic device such as a computing device or server having a processor to communicate via the network 105, for example with at least one content provider computing device 115, at least one content publisher computing device 120, at least one client device 125, or at least one third party server 130.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 110 and at least one third party server 130. The data processing system 110 and third party server 130 can each include at least one logic device such as a computing device having a processor to communicate via the network 105, for example with the client device 125, the web site operator or content publisher computing device 115, and at least one content provider computing device 125. The data processing system 110 and third party server 130 can each include at least one server. For example, the data processing system 110 or third party server 130 can each include a plurality of servers located in at least one data center. The data processing system 110 and third party server 130 each can include multiple, logically-grouped servers and facilitate distributed computing techniques. The logical group of servers may be referred to as a server farm or a machine farm. The servers can also be geographically dispersed. A machine farm may be administered as a single entity, or the machine farm can include a plurality of machine farms. The servers within each machine farm can be heterogeneous—one or more of the servers or machines can operate according to one or more type of operating system platform. The third party server 130 can include many of the same or similar functionalities and modules as the data processing system 110 described herein, among others.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralizing the servers and storage systems and coupling them with advanced system management tools allows more efficient use of server resources.

The data processing system 110 can include a mapping module 135, an encryption module 140, and at least one database 145. The mapping module 135 or encryption module 140 can include at least one processing unit or other logic device such as a programmable logic array engine, or module configured to communicate with the database 145. The mapping module 135 and encryption module 140 can be separate components, a single component, or a part of the data processing system 110. The system 100 and its components, such as a data processing system, may include hardware elements, such as one or more processors, logic devices, or circuits. One or more modules of, in communication with, or otherwise associated with the third party server 130 can include many of the same functionalities as the mapping module 135 or the encryption module 140.

The data processing system 110 and the third party server 130 each can obtain anonymous computer network activity information associated with a plurality of computing devices 110. A user of a client device 125 can affirmatively authorize the data processing system 110 to obtain network activity information corresponding to the user's client device 125. For example, the data processing system 110 can prompt the user of the client device 125 for affirmative consent to obtain one or more types of network activity information, such as geographic location information. The identity of the user of the client device 125 can remain anonymous and the client device 125 may be associated with a unique identifier (e.g., a unique identifier for the user or the computing device provided by the data processing system or a user of the computing device). The data processing system can associate each observation with a corresponding unique identifier.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

The content provider computing devices 115 can include servers or other computing devices operated by a content provider entity to provide content items such as advertisements for display on information resources at the client device 125. The content provided by the content provider computing device 115 can include third party content items (e.g., ads) for display on information resources such as a website or web page that includes primary content, e.g. content provided by the content publisher computing device 120. The content items can also be displayed on a search results web page. For example, the content provider computing device 115 can provide or be the source of ads or other content items for display in content slots of content web pages such as a web page of a company where the primary content of the web page is provided by the company, or for display on a search results landing page provided by a search engine. The content items associated with the content provider computing device 115 can be displayed on information resources other than web pages, such as content displayed as part of the execution of an application on a smartphone or other client device 125.

The content publisher computing devices 120 can include servers or other computing devices operated by a content publishing entity to provide primary content for display via the network 105. For example, the content publisher computing device 120 can include a web page operator who provides primary content for display on the web page. The primary content can include content other than that provided by the content publisher computing device 120, and the web page can include content slots configured for the display of third party content items (e.g., ads) from the content provider computing device 115. For example, the content publisher computing device 120 can operate the website of a company and can provide content about that company for display on web pages of the website. The web pages can include content slots configured for the display of third party content items such as ads of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115.

The client devices 125 can include computing devices configured to communicate via the network 105 to display data such as the content provided by the content publisher computing device 120 (e.g., primary web page content or other information resources) and the content provided by the content provider computing device 115 (e.g., third party content items such as ads configured for display in a content slot of a web page). The client device 125, the content provider computing device 115, and the content publisher computing device 120 can include desktop computers, laptop computers, tablet computers, smartphones, personal digital assistants, mobile devices, client devices, consumer computing devices, servers, clients, and other computing devices. The client device 125, the content provider computing device 115, and the content publisher computing device 120 can include user interfaces such as microphones, speakers, touchscreens, keyboards, pointing devices, a computer mouse, touchpad, or other input or output interfaces.

The data processing system 110 can transmit a first identifier vector to a third party server 130. The first identifier vector can include a first identifier, a plurality of first parameters, and a plurality of second parameters. The first identifier, the plurality of first parameters, and the plurality of second parameters can be stored in and obtained from the one or more databases 145. The first identifier vector can be, for example, of the form of an indexed tuple, one or multiple dimensional array, container, linked list, tree, or any data structure suitable to store or otherwise index logged user interactions, such as the first identifier, plurality of first parameters, and plurality of second parameters. The first identifier can include, for example, an account identifier, device identifier, phone number, or a combination thereof, or any other identifier to identify a particular user or client device 125. The first identifier can be, for example, of the form of an alphanumerical string, a randomly or pseudo-randomly generated number, or a character string, among others. The plurality of first parameters and plurality of second parameters each can catalog or otherwise index log data of interactions by the one or more client devices 125 with the data processing system 110, the content provider computing device 115, or the content publisher computing device 120, via the network 105. The log data of interactions by the one or more client devices 125 can be stored in and obtained from the one or more databases 145. The plurality of first parameters can include location identifiers of the associated recorded interaction. The plurality of second parameters can include time stamps of the associated recorded interaction. The plurality of first parameters and the plurality of second parameters can include other parameters or data used to catalog or record log data of interactions by the one or more client devices 125. Represented mathematically, the first identifier vector can be, for example, of the form:

$$X \triangleq [ID_X, \{(p_1, q_1), (p_2, q_2), \ldots (p_N, q_N)\}]$$

where X is the first identifier vector, $ID_X$ is the first identifier, $p_n$ is the first parameter for the n-th recorded interaction, and $q_n$ is the second parameter for the n-th recorded interaction. For example, the first parameters can be location identifier of recorded interactions and second parameters can be time stamps of recorded interactions. Furthermore, the client device 125 with the device identifier "x345q$" can have transmitted a request for a webpage on Jul. 14, 2015 at time 15:34:11 from San Jose, Calif. and then another request for another webpage on Jul. 15, 2015 at time 9:12:34 from Folsom, Calif., both requests recorded by the data processing system 110 at the one or more databases 145. In this example, $ID_A$ would be "x345q$", $p_1$ would be "San Jose, Calif.," $q_1$ would be "Jul. 14, 2015 15:34:11," $p_2$ would be "Folsom, Calif.," and $q_2$ would be "Jul. 15, 2015 9:12:34."

The encryption module 140 can categorize the plurality of first parameters and the plurality of second parameters into a plurality of first categories based on the respective value of the plurality of first parameters or the respective value of the plurality of second parameters. The encryption module 140 can categorize the plurality of first parameters and the plurality of second parameters into a plurality of first categories based on a first quantization of the plurality of first parameters. The encryption module 140 can categorize the plurality of first parameters and the plurality of second parameters into a plurality of second categories based on a second quantization of the plurality of second parameters. The first quantization can define or otherwise specify which of the plurality of first parameters are categorized into the respective first category. The second quantization can define or otherwise specify which of the plurality of second parameters are categorized into the respective second category. The first quantization and the second quantization can be used to assign, categorize, or classify a first parameter and the second parameter respectively to a more genericized category. The encryption module 140 can generate a plurality of first category values and a plurality of second category values. Each of the plurality of first categories and each of the plurality of second categories can be associated with a category value or index, such as, for example, a randomly generated alphanumeric value. From the previous example, if the first quantization is by city and the second quantization is by date, the encryption module 140 can categorize the request for the webpage on Jul. 14, 2015 at time 15:34:11 from San Jose, Calif. in a category different from the request for the other webpage on Jul. 15, 2015 at time 9:12:34 from Folsom, Calif. based on the quantizations for the respective category. In addition, each of these categories can then be assigned a different random alphanumeric value. Represented mathematically, the first identifier vector can be, for example, of the form:

$$X \triangleq [ID_X, \{\langle (p_1, q_1), (p_2, q_2) \ldots \rangle_i, \ldots \langle (p_N, q_N) \rangle_I\}]$$

where X is the first identifier vector, $ID_X$ is the first identifier, $p_n$ is the first parameter for the n-th recorded interaction, $q_n$ is the second parameter for the n-th recorded interaction, and $\langle \ldots \rangle_i$ denotes the i-th respective category value into which the first parameter $p_n$ and the second parameter $q_n$ were categorized based on the first parameter value or the second parameter value, or a combination thereof. The data processing system 110 can transmit a first identifier vector that includes a first identifier and a plurality of first category values or the plurality of second category values to the third party server 130. The data processing system 110 can transmit a first identifier vector that includes a first identifier and a plurality of first categories or the plurality of second categories to the third party server 130.

The encryption module 140 can generate a plurality of first combinations of the plurality of first parameters and the plurality of second parameters. Each of the plurality of first combinations can be generated, for example, based on a hash function or cipher function of each of the plurality of first parameters and each of the plurality of second parameters. Represented mathematically, using a hash function of a location identifier as the first parameter and a time stamp as the second parameter, the first identifier vector can be, for example, of the form:

$$X \triangleq [ID_X, \{\langle h(l_1, t_1), h(l_2, t_2) \ldots \rangle_i, \ldots \langle h(l_N, t_N) \rangle_I\}]$$

where X is the first identifier vector, $ID_X$ is the first identifier, in is the location identifier for the n-th recorded interaction, to is the time stamp for the n-th recorded interaction, $\langle \ldots \rangle_i$ denotes the i-th respective category value into which the location identifier $l_n$ and the time stamp $t_n$ were categorized based on the location identifier or the time stamp, and $h(\cdot)$ is the hash function. The data processing system 110 can transmit the first identifier vector including the first identifier and the plurality of first combinations to the third party server 130.

The encryption module 140 can encrypt the first identifier, the plurality of first parameters, and the plurality of second parameters based on a first party encryption. The encryption module 140 can encrypt the first identifier, the plurality of first parameters and the plurality of first combinations. Examples of the first party encryption can include asymmetric encryption algorithms, cryptographic hash functions, fingerprints, or any other encryption algorithm that may be commutative. For example, the encryption module 140 can use an RSA cryptosystem technique, in which the encryption key may be known to every computing device and may be different from the decryption key which may be kept secret. In this example, the asymmetry may be based on the difficulty of factoring the product of two large prime numbers. Represented mathematically, using a hash function of a location identifier as the first parameter and a time stamp as the second parameter, the first identifier vector encrypted based on the first party encryption can be, for example, of the form:

$$\overline{X} \triangleq AX = A[ID_X\{\langle h(p_1,q_1), h(p_2,q_2)\ldots\rangle_i, \ldots \langle h(p_N,q_N)\rangle_I\}]$$

where $\overline{X}$ is the encrypted first identifier vector, X is the first identifier vector, A is the first party encryption matrix, $ID_X$ is the first identifier, $l_n$ is the location identifier for the n-th recorded interaction, $t_n$ is the time stamp for the n-th recorded interaction, $\langle\ldots\rangle_i$ denotes the i-th respective category value into which the location identifier $l_n$ and the time stamp $t_n$ were categorized, and $h(\cdot)$ is the hash function. In this example, using the first party encryption matrix A, the encryption module 140 can apply a different encryption algorithm for each or some of the first identifier and the respective category value of the plurality of first categories and the respective category value of the plurality of second categories. The data processing system 110 can transmit the first identifier vector encrypted based on the first party encryption to the third party server 130, subsequent or responsive to encrypting the first identifier, the plurality of first parameters, and the plurality of second parameters based on the first party encryption.

The encryption module 140 can generate dummy data for the plurality of first parameters and the plurality of second parameters. Some of the plurality of the first parameters and some of the plurality of the second parameters each can include dummy data. Dummy data can include randomly generated first parameters and second parameters for interactions. Dummy data can be, for example, indicative of interactions that the one or more client devices 125 actually may not have performed. The encryption module 140 can insert the dummy data into the plurality of first parameters and the plurality of second parameters. The data processing system 110 can transmit the first identifier vector, including the dummy data, to the third party server 130.

The data processing system 110 can receive, from the third party server 130, the first identifier vector encrypted based on a third party encryption associated with the third party server 130. Receipt of the first identifier vector by the third party server 130 can cause or otherwise trigger the third party server 130 or one or more entities or devices associated with the third party server 130 to encrypt the received first identifier vector based on the third party encryption. Subsequent to or simultaneous with transmitting the first identifier vector to the third party server 130, the data processing system 110 can also transmit to the third party server 130 a request to encrypt the first identifier vector. The request to encrypt the first identifier vector can also cause or otherwise trigger the third party server 130 or one or more entities associated with the third party server 130 to encrypt the first identifier vector based on the third party encryption. Examples of the third party encryption can include asymmetric encryption algorithms, cryptographic hash functions, fingerprints, or any other encryption algorithm that may be commutative. Represented mathematically, using a hash function of a location identifier as the first parameter and a time stamp as the second parameter, the first identifier vector further encrypted based on the third party encryption can be, for example, of the form:

$$\overline{\overline{X}} \triangleq B\overline{X} = BAX = BA[ID_X\{\langle h(l_1,t_1), h(l_2,t_2)\rangle_i, \ldots \langle h(l_N,t_N)\rangle_I\}]$$

where $\overline{\overline{X}}$ is the first identifier vector doubly encrypted by the first party encryption and the third party encryption, $\overline{X}$ is the first identifier vector encrypted by the first party encryption, X is the first identifier vector, B is the third party encryption matrix, A is the first party encryption matrix, $ID_X$ is the first identifier, $l_n$ is the location identifier for the n-th recorded interaction, $t_n$ is the time stamp for the n-th recorded interaction, $\langle\ldots\rangle_i$ denotes the i-th respective category value into which the location identifier $l_n$ and the time stamp $t_n$ were categorized based on the location identifier or the time stamp, and $h(\cdot)$ is the hash function.

The data processing system 110 can receive from the third party server 130 a second identifier vector encrypted based on the third-party encryption associated with the third party server 130. The second identifier vector can include a second identifier, a plurality of third parameters, and a plurality of fourth parameters. The second identifier, the plurality of third parameters, and the plurality of fourth parameters can be stored in and obtained from the one or more databases at or associated with the third party server 130. The plurality of third parameters and the plurality of first parameters can be of a first type of parameter. The plurality of fourth parameters and the plurality of second parameters can be of a second type of parameter. For example, if the plurality of first parameters and the plurality of second parameters were location identifiers and time stamps respectively each identifying a location and time of the interaction recorded by the one or more databases 145, the plurality of third parameters and the plurality of fourth parameters can also be location identifiers and time stamps respectively of the interactions recorded by the third party server 130. The second identifier vector can be, for example, of the form of an indexed tuple, one or multiple dimensional array, container, linked list, tree, or any data structure suitable to store or otherwise index logged user interactions, such as the second identifier, plurality of third parameters, and plurality of fourth parameters. The second identifier can include, for example, an account identifier, device identifier, phone number, or a combination thereof, or any other identifier to identify a particular user or client device 125. The plurality of third parameters and plurality of fourth parameters each can catalog or otherwise index log data of interactions by the one or more client devices 125 with the third party server 130, the content provider computing device 115, or the content publisher computing device 120 via the network 105. The log data of interactions by the one or more client devices 125 can be stored in and obtained from the one or more databases at or associated with the third party server 130. The plurality of third parameters can include location identifiers of the associated recorded interaction. The plurality of fourth parameters can include time stamps of the associated interaction. The plurality of third parameters and the plurality of fourth parameters can include other parameters or data used to catalog or record log data of interactions by the one or more client devices 125.

The data processing system 110 can transmit a request for the second identifier vector to the third party server 130. Receipt of the request for the second identifier vector to the third party server 130 can cause or otherwise trigger the third party server 130 to encrypt the second identifier vector and transmit the encrypted second identifier vector to the data processing system 110. Receipt of the first identifier vector by the third party server 130 can also cause or otherwise trigger the third party server 130 to encrypt the second identifier vector and transmit the encrypted second identifier vector to the data processing system 110. The data processing system 110 can also receive from the third party server 130 the second identifier vector encrypted based on the third party encryption associated with the third party server 130, prior to transmitting the request for the second identifier vector or the first identifier vector to the third party server 130. Examples of the third party encryption can include asymmetric encryption algorithms, cryptographic hash functions, fingerprints, or any other encryption algorithm that may be commutative. Represented mathematically, the second identifier vector encrypted based on the third party encryption can be, for example, of the form:

$$\overline{Y} \triangleq BY = B[ID_Y, \{(r_1, s_1), (r_2, s_2), \ldots (r_M, s_M)\}]$$

where $\overline{Y}$ is the encrypted second identifier vector, Y is the second identifier vector, B is the third party encryption matrix, $ID_Y$ is the second identifier, $r_m$ is the third parameter for the m-th recorded interaction, and $s_m$ is the fourth parameter for the m-th recorded interaction. Using the third party encryption matrix B, different encryption algorithms may be applied to each or some of the second identifier, the plurality of third parameters, and the plurality of fourth parameters are encrypted. For example, the third parameters can be location identifier of recorded interactions and fourth parameters can be time stamps of recorded interactions. Furthermore, the one or more client devices 125 associated with the account identifier "cr3a1q@example_mail.com" could have made a purchase from a physical store at Jul. 15, 2015 at time 8:50:02 located in San Jose, Calif. and then another purchase order on the user's client device 125 from a webpage at Jul. 15, 2015 at 9:19:59 from Folsom, Calif., both purchase orders recorded at one or more databases at the third party server 130. In this example, the $ID_Y$ would be "cr3a1q@example_mail.com," $r_1$ would be "San Jose, Calif.," $s_1$ would be "Jul. 15, 2015 8:50:02," $r_2$ would be "Folsom, Calif.," and $s_2$ "Jul. 15, 2015 9:19:59."

The data processing system 110 can receive from the third party server 130 the second identifier vector that includes the second identifier and a plurality of third category values or a plurality of fourth category values. The plurality of third category values or the plurality of fourth category values can be based on a plurality of third categories and the plurality of fourth categories. The plurality of third parameters and the plurality of fourth parameters can be assigned, categorized, or otherwise classified into the plurality of third categories based on the respective value of the plurality of third parameters or the respective value of the plurality of fourth parameters, or a combination thereof. The plurality of third parameters and the plurality of fourth parameters can be assigned, categorized, or otherwise classified into a plurality of third categories based on a third quantization of plurality of third parameters. The plurality of third parameters and the plurality of fourth parameters can be assigned, categorized, or otherwise classified into a plurality of fourth categories based on a fourth quantization of plurality of fourth parameters. The third quantization can define or otherwise specify which of the plurality of third parameters are categorized into the respective third category. The fourth quantization can define or otherwise specify which of the plurality of fourth parameters are categorized into the respective fourth category. Each of the plurality of third categories and each of the plurality of fourth categories can be associated with a category value or index, such as, for example, a randomly generated alphanumeric value. Using the previous example, if the fourth quantization specified that all purchase orders made on July 15 before 12:00:00 were to be categorized into a single category, the purchase order made on Jul. 15, 2015 at 8:50:02 and the purchase order made on Jul. 15, 2015 at 9:19:59 can be categorized into the same category and be associated with the same category index. Represented mathematically, a location identifier as the third parameter and a time stamp as the fourth parameter, the second identifier vector can be, for example, of the form:

$$\overline{Y} \triangleq BY = B[ID_Y, \{\langle(r_1, s_1), (r_2, s_2)\rangle_j, \ldots \langle(r_M, s_M)\rangle_j\}]$$

where $\overline{Y}$ is the encrypted second identifier vector, Y is the second identifier vector, B is the third party encryption matrix, $ID_Y$ is the second identifier, $r_m$ is the third parameter for the m-th recorded interaction, and $s_m$ is the fourth parameter for the m-th recorded interaction, and $\langle \ldots \rangle_j$ denotes the j-th respective category value into which the third parameter $r_m$ and the fourth parameter $s_m$ were categorized based on the value of the third parameter or the fourth parameter or a combination thereof.

The data processing system 110 can receive from the third party server 130 the second identifier vector that includes the second identifier and a plurality of second combinations of the plurality of third parameters and the plurality fourth parameters. Each of the plurality of second combinations can be generated, for example, based on a hash function or cipher function of each of the plurality of first parameters and each of the plurality of second parameters. Represented mathematically, using a hash function of a location identifier as the third parameter and a time stamp as the fourth parameter, the second identifier vector can be, for example, of the form:

$$\overline{Y} \triangleq BY = B[ID_Y, \{\langle\chi(\lambda_1, \tau_1), \chi(\lambda_2, \tau_2)\rangle_j, \ldots \langle\chi(\lambda_N, \tau_N)\rangle_j\}]$$

where $\overline{Y}$ is the encrypted second identifier vector, Y is the second identifier vector, $ID_Y$ is the second identifier, B is the third party encryption matrix, $\lambda_m$ is the location identifier for the m-th recorded interaction, $\tau_m$ is the time stamp for the m-th recorded interaction, $\langle \ldots \rangle_j$ denotes the j-th respective category value into which the third parameter $\lambda_m$ and the time stamp $\tau_m$ were categorized based on either the location identifier or the time stamp or a combination thereof, and $\chi(\cdot)$ is the hash function. The hash function applied by the third party server 130, $\chi(\cdot)$, can be same or different from the hash function applied by the encryption module 140, $h(\cdot)$. The data processing system 110 can receive the second identifier vector including the second identifier and the plurality of second combinations from the third party server 130.

The encryption module 140 can encrypt the second identifier vector based on the first party encryption, responsive to receiving the second identifier vector from the third party server 130. The encryption module 140 can encrypt the second identifier, the plurality of third parameters, and the plurality of fourth parameters based on the first party encryption. The encryption module 140 can encrypt the second identifier, the plurality of third parameters, and the plurality of fourth parameters based on the same encryption technique that the encryption module 140 used to encrypt the first identifier, the plurality of first parameters, and the plurality of second parameters. Represented mathematically, using a hash function of a location identifier as the third parameter and a time stamp as the fourth parameter, the second identifier vector further encrypted based on the first party encryption can be, for example, of the form:

$$\overline{Y} \triangleq A\overline{Y} = ABY = AB[ID_Y\{\langle\chi(\lambda_1,\tau_1),\chi(\lambda_2,\tau_2)\rangle_j, \ldots \langle\chi(\lambda_N,\tau_N)\rangle_j\}]$$

where $\overline{Y}$ is the second identifier vector doubly encrypted by the first party encryption and the third party encryption, $Y$ is the second identifier vector encrypted by the first party encryption, Y is the second identifier vector, B is the third party encryption matrix, A is the first party encryption matrix, $ID_Y$ is the second identifier, $\lambda_m$ is the location identifier for the m-th recorded interaction, $\tau_m$ is the time stamp for the m-th recorded interaction, $\langle \ldots \rangle_j$ denotes the j-th respective category value into which the third parameter $\lambda_m$ and the time stamp $\tau_m$ were categorized based on either the location identifier or the time stamp or a combination thereof, and $\chi(\cdot)$ is the hash function.

The mapping module 135 can determine a correlation count between the first identifier vector and the second identifier vector based on a match between some of the plurality of first parameters and some of the plurality of third parameters and between some of the plurality of second parameters and some of the plurality of fourth parameters. The mapping module 135 can determine the correlation count for a respective category of the plurality of categories based on a match between the plurality of first categories and the plurality of second categories versus the plurality of third categories and the plurality of fourth categories. A match can be indicative of an identity, similarity, correlation, or otherwise correspondence between some of the plurality of first parameters and some of the plurality of the third parameters and between some of the plurality of the second parameters and some of the plurality of fourth parameters. For example, the first identifier vector can include a location parameter as a first parameter and a time stamp as a second parameter classified into a category for website requests occurring from San Jose, Calif. at Jul. 15, 2015 between 14:00:00 to 16:00:00. Furthermore, the second identifier vector can include a location parameter as a third parameter and a time stamp as a fourth parameter classified into a category for purchase orders occurring from San Jose, Calif. at Jul. 15, 2015 between 14:00:00 to 16:00:00. In this example, both the first identifier vector and the second identifier vector can have been doubly encrypted based on the same first party encryption and the same third party encryption. The mapping module 135 can determine that there is a match between the encrypted first parameter and the encrypted third parameter and between the encrypted second parameter and encrypted fourth parameter based on identical match of the ciphers from the categories. Responsive to determining that there is a match between the between the plurality of encrypted first parameters and the plurality of encrypted third parameters and between the plurality of encrypted second parameters and the plurality of encrypted fourth parameters, the mapping module 135 can increment the correlation count.

The mapping module 135 can determine the correlation count based on the some of the plurality of first parameters being within a first margin of the plurality of third parameters and some of the plurality of second parameters being within a second margin of the plurality of fourth parameters. The mapping module 135 can determine the correlation count based on the some of the plurality of first category values being within a category margin of the plurality of third category values and some of the plurality of second category values being within a second margin of the plurality of fourth parameters. The mapping module 135 can determine the correlation count based on some of the plurality of the first parameters being within a threshold distance of some of the plurality of the third parameters and some of the plurality of the second parameters being with a time window. For example, the first identifier vector can include a location parameter as a first parameter and a time stamp as a second parameter classified into a category for website requests occurring from zip code 95630 at Jul. 15, 2015 between 14:00:00 to 16:00:00. Furthermore, the second identifier vector can include a location parameter as a third parameter and a time stamp as a fourth parameter classified into a category for purchase orders occurring from zip code 95763 at Jul. 15, 2015 between 16:00:00 to 18:00:00. The respective category indices of the first identifier vector and the second identifier vector can have been doubly encrypted by the first party encryption and the third party encryption. In this example, the threshold distance can be specified as adjacent zip codes and the time stamp can be specified as contiguous time frames. The mapping module 130 can access a list of zip codes from the one or more databases 145 and determine that zip code 95630 and zip code 95763 are adjacent to each other. The mapping module 130 can determine the time frames 14:00:00 to 16:00:00 is contiguous with 16:00;00 to 18:00:00. Responsive to these determinations, the mapping module 135 can determine that there is a match between the first parameter and the third parameter and the second parameter and the fourth parameter, and increment the correlation count for the respective category.

The mapping module 135 can determine that the first identifier corresponds to the second identifier based on the correlation count between the first identifier vector and the second identifier vector being above a determined threshold. The determine threshold can be based on integer, fraction, or percentage, among others. The determine threshold can also be constant, varying, or randomly generated, among others. The mapping module 135 can determine the determined threshold based on the length of the plurality of first parameters, the plurality of second parameters, the plurality of third parameters, and the plurality of fourth parameters. For example, the lengths of the plurality of first parameters and plurality of second parameters each can be 15,000. Furthermore, the lengths of the plurality of third parameters and the plurality of fourth parameters each can be 3,000. In this example, the mapping module 135 can calculate the ratio between the lengths of the plurality of first parameters and plurality of second parameters versus the plurality of third parameters and plurality of fourth parameters. The mapping module 135 can then determine the determined threshold for the correlation count based on a fractional multiplicative factor of the ratio between the lengths. In this example, the mapping module 135 can then determine that the first identifier (e.g., "x345q$") corresponds to the second identifier (e.g., "cr3a1q@example_mail.com") based on the correlation count being above the determined threshold.

The mapping module 135 can generate one identifier key for both the first identifier and the second identifier, responsive to determining that the first identifier corresponds to the second identifier. The one identifier key can be, for example, of the form of an alphanumerical string, a randomly generated number, or a character string, among others. The one identifier key can include the first identifier stored on the one or more databases 145 of the data processing system 110. For example, if the first identifier were an account identifier such as an email address, the mapping module 135 can set the email address as the one identifier key.

The mapping module 135 can determine that a predefined time has passed since generating the one identifier key. The mapping module 135 can delete the first identifier vector and the second identifier vector, responsive to determining that the predefined that has passed. The mapping module 135 can delete the first identifier vector and the second identifier vector, responsive to generating the one identifier key. The mapping module 135 can store the first identifier vector and the second identifier vector in the one or more databases 145 for generating the one identifier key for the first identifier and the second identifier, responsive to determining that the correlation count is within a tolerance range below the determined threshold.

Figure 2:
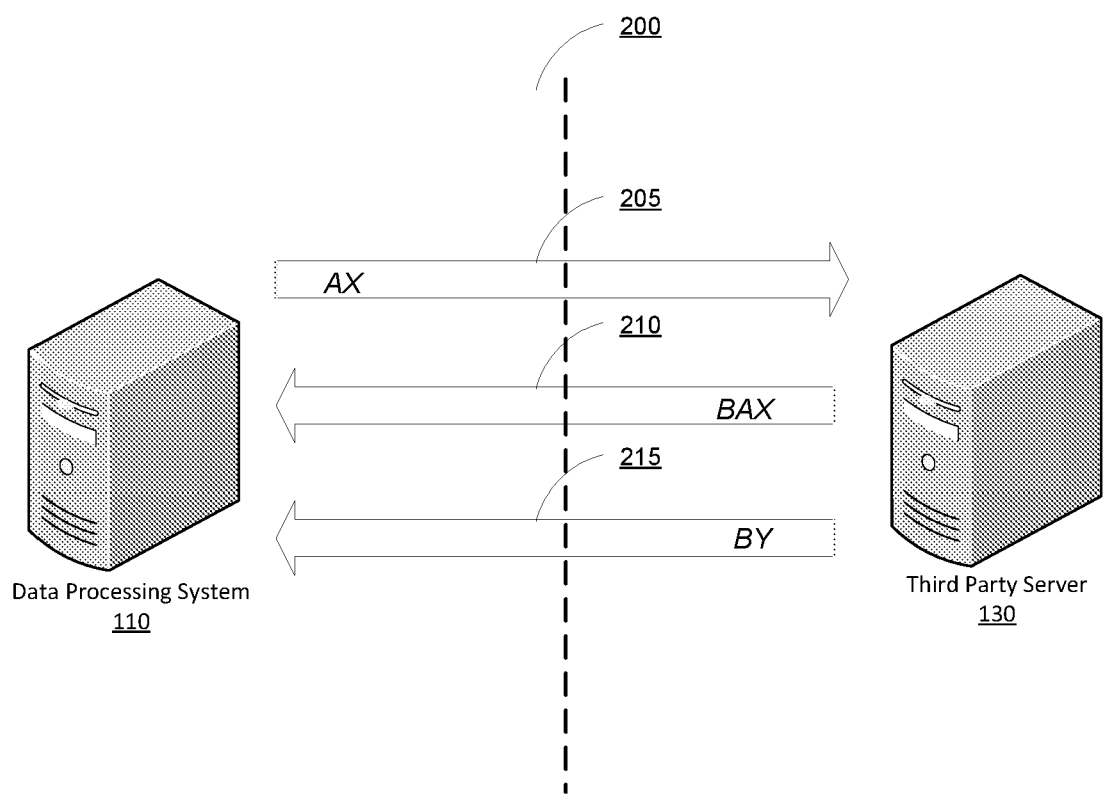
FIG. 2 is a block diagram depicting one example computer networked environment to match identifiers between different datasets, according to an illustrative implementation.

FIG. 2 is a block diagram depicting one example computer networked environment 200 to match identifiers between different datasets, according to an illustrative implementation. Environment 200 can include a subset of the system 100, focusing on the transmission and receiving data flow 205, 210, and 215 between the data processing system 110 and the third party server 130. In this example, the data processing system 110 can transmit, to the third party server 130, the encrypted first identifier vector, AX, where A is the first party encryption matrix and X is the first identifier vector (Identifier 205). The transmission of the encrypted first identifier vector, AX, can cause or trigger the third party server 130 to further encrypt the first identifier vector based on the third party encryption. The data processing system 110 can subsequently receive, from the third party server 130, the doubly encrypted first identifier vector, BAX, where B is the third party encryption matrix (Identifier 210). Independently of or subsequent to the transmission of the encrypted first identifier vector, the data processing system 110 can receive, from the third party server 130, the encrypted second identifier vector, BY, where A is the second party encryption matrix and Y is the first identifier vector (Identifier 215). Having received the singly encrypted second identifier vector from the third party server 130, the data processing system 110 can further encrypt the already encrypted second identifier vector based on the first party encryption, ABY. The data processing system 110 can determine whether the first identifier and second identify correspond to each other based on a match between the parameters of the first identifier vector and parameters of the second identifier vector. Based on the determination of correspondence, the data processing system can generate one identifier key for both the first identifier and the second identifier.

Figure 3:
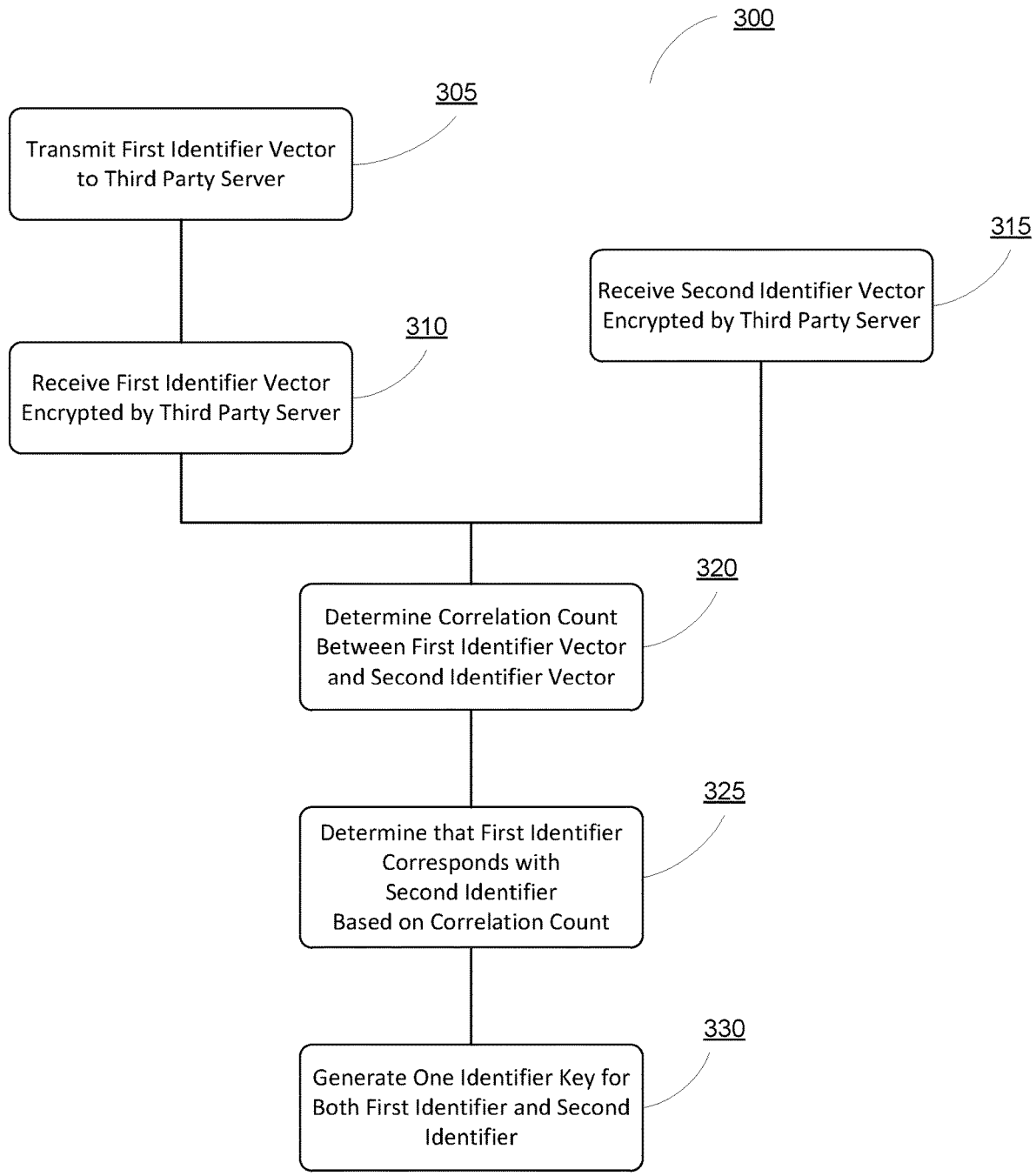
FIG. 3 is a flow diagram depicting an example method of matching identifiers between different datasets, according to an illustrative implementation.

FIG. 3 is a flow diagram depicting an example method 300 of matching identifiers between different datasets, according to an illustrative implementation. The functionality described herein with respect to method 300 can be performed or otherwise executed by the data processing system 110 or the various modules of the data processing system 110 shown in FIG. 1. The method 300 can be performed or executed at various time intervals, ranging from once every few seconds or minutes to once every predetermined number of days. The method 300 can be performed or executed upon the fulfillment of a conditional, e.g., a condition determined or received by the data processing system 110 such as accumulating a predetermined number of the plurality of first parameters and the plurality of second parameters. The method 300 can be performed, responsive to a request from the content provider computing device 115, content publisher computing device 120, one or more client devices 125, or third party server 130.

The method 300 can transmit a first identifier vector to a third party server (ACT 305). For example, the data processing system 110 can transmit the first identifier vector to the third party server 120 via the network 105. The data processing system 110 can transmit the first identifier vector, encrypted based on the first party encryption. The first identifier vector can include a first identifier, a plurality of first parameters, and a plurality of second parameters. Each of the plurality of first parameters and each of the plurality of second parameters can include log data of the network activity or interactions with the data processing system 110 by the one or more client device 125 associated with the first identifier.

The method 300 can receive the first identifier vector encrypted by the third party server (ACT 310). For example, the data processing system 110 can receive the first identifier vector encrypted by the third party server 120 via the network 105. The encryption technique applied to the first identifier vector may be a third party encryption associated with the third party server 120.

The method 300 can receive a second identifier vector encrypted by the third party server (ACT 315). For example, the data processing system 110 can receive the second identifier vector from the third party server 120 via the network. The second identifier vector can include a second identifier, a plurality of third parameters, and a plurality of fourth parameters. Each of the plurality of third parameters and each of the plurality of fourth parameters can include log data of the network activity or interactions with the third party server 120 by the one or more client device 125 associated with the second identifier. The encryption technique applied to the second identifier vector may be a third party encryption associated with the third party server 120.

The method 300 can determine a correlation count between the first identifier vector and the second identifier vector (ACT 320). For example, the data processing system 110 can determine the correlation count between the first identifier vector and the second identifier vector based on determining whether there is a match between some of the plurality of first parameters and some of the plurality of the third parameters and between some of the plurality of second parameters and some of the plurality of fourth parameters. The data processing system 110 can determine that there is a match between the respective parameters, for example, when one of the plurality of first parameters is within a first margin of one of the plurality of second parameters and when one of the plurality of third parameters is within a second margin of one of the plurality of fourth parameters.

The method 300 can determine that the first identifier corresponds with the second identifier based on the correlation count (ACT 325). For example, the data processing system 110 can determine that the first identifier corresponds with the second identifier based on the correlation count being above a determined threshold. The data processing system 110 can determine the threshold based on the lengths of the plurality of first parameters, the plurality of second parameters, the plurality of third parameters, and the plurality of fourth parameters.

The method 300 can generate one identifier key for both the first identifier and the second identifier (ACT 330). For example, the data processing system 110 can generate the one identifier key for both the first identifier and the second identifier, responsive to determining that the first identifier corresponds with the second identifier. The data processing system 110 can set the first identifier as the one identifier key.

Figure 4:
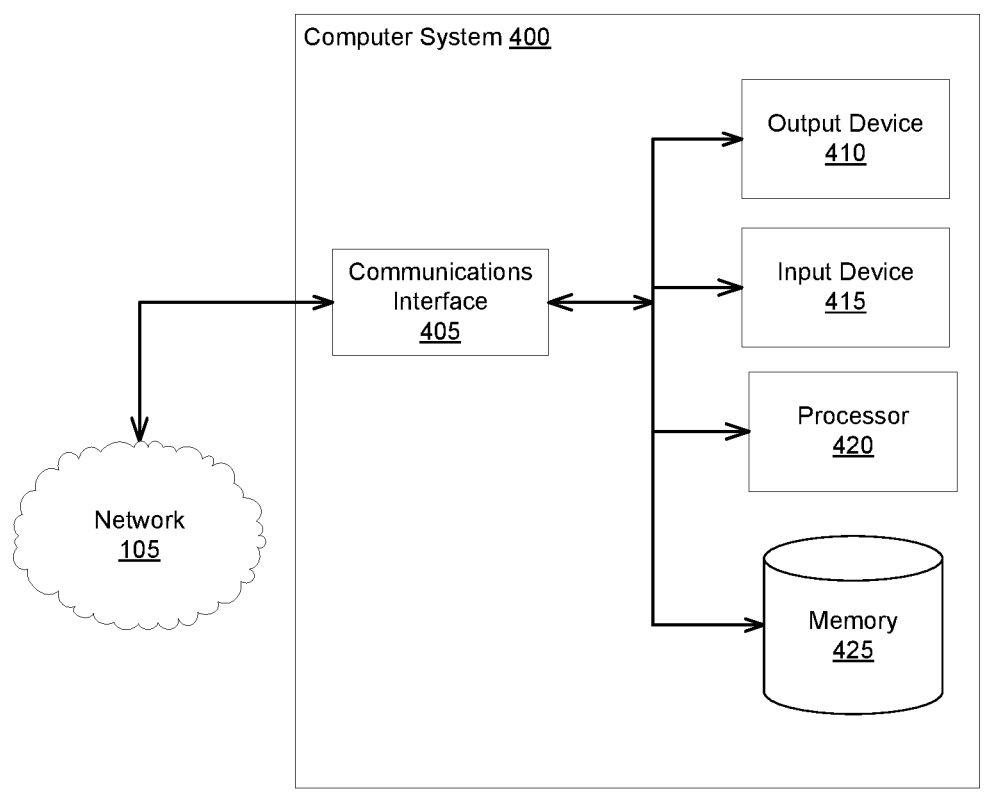
FIG. 4 is a block diagram illustrating a general architecture for a computer system that may be employed to implement elements of the systems and methods described and illustrated herein, according to an illustrative implementation.

FIG. 4 is a block diagram illustrating a general architecture for a computer system 400 that may be employed to implement elements of the systems and methods described and illustrated herein, according to an illustrative implementation. The computer system or computing device 400 can include, be part of, or be used to implement the system 100, data processing system 110, mapping module 135, encryption module 140, or the third party server 130. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, is coupled to the bus 405 for persistently storing information and instructions.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435.

The processes, systems and methods described herein can be implemented by the computing system 400 in response to the processor 410 executing an arrangement of instructions contained in main memory 415 or read only memory ROM 420. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. In alternative implementations, hard-wired circuitry may be used in place of or in combination with software instructions to effect illustrative implementations. Thus, implementations are not limited to any specific combination of hardware circuitry and software.

Although an example computing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular implementations of the subject matter have been described. Other implementations are within the scope of the following claims. While operations are depicted in the drawings in a particular order, this should not be understood as requiring that such operations be performed in the particular order shown or in sequential order, or that all illustrated operations are required to be performed. Actions described herein can be performed in a different order. In addition, the processes depicted in the accompanying figures do not necessarily require the particular order shown, or sequential order, to achieve desirable results. In certain implementations, multitasking and parallel processing may be advantageous.

The separation of various system components does not require separation in all implementations, and the described program components can be included in a single hardware or software product. For example, the selection module 130 or the selection factor determination module 135 can be a single module, a logic device having one or more processing circuits, or part of an online content item placement system.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementation," "an alternate implementation," "various implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method of matching identifiers between multiple datasets in a computer network environment, comprising:
transmitting, by a data processing system having one or more processors, a first identifier vector to a third party server, the first identifier vector comprising a first identifier, a plurality of first parameters, and a plurality of second parameters;
receiving, by the data processing system, from the third party server, the first identifier vector that was (i) encrypted based on a first-party encryption that is commutative and (ii) further encrypted by a third-party encryption associated with the third party server, the third-party encryption being commutative and different from the first-party encryption;
receiving, by the data processing system, from the third party server, a second identifier vector encrypted based on the third-party encryption associated with the third party server, the second identifier vector comprising a second identifier, a plurality of third parameters, and a plurality of fourth parameters;
encrypting, by the data processing system, the second identifier vector with the first-party encryption to generate an encrypted second identifier vector that is encrypted based on the third-party encryption and further encrypted based on the first-party encryption;
determining, by the data processing system, a correlation count between the encrypted first identifier vector and the encrypted second identifier vector based on a match between some of the plurality of first parameters and some of the plurality of third parameters of the encrypted first identifier vector, and between some of the plurality of second parameters and some of the plurality of fourth parameters of the encrypted second identifier vector;
determining, by the data processing system, that the first identifier corresponds to the second identifier based on the correlation count between the first identifier vector and the second identifier vector being above a determined threshold; and
generating, by the data processing system, responsive to determining that the first identifier corresponds to the second identifier, one identifier key for both the first identifier and the second identifier.

2. The method of claim 1, comprising:
encrypting, by the data processing system, the first identifier, the plurality of first parameters, and the plurality of second parameters based on the first-party encryption; and
transmitting, by the data processing system, the first identifier vector, responsive to encrypting the first identifier, the plurality of first parameters, and the plurality of second parameters based on the first party encryption.

3. The method of claim 2, comprising:
encrypting, by the data processing system, the second identifier, the plurality of third parameters and the plurality of fourth parameters of the second identifier vector based on the first encryption; and
determining, by the data processing system, the correlation count between the encrypted first identifier vector and encrypted second identifier vector, responsive to encrypting the second identifier, the plurality of third parameters, and the plurality of fourth parameters.

4. The method of claim 1, comprising:
receiving, by the data processing system, the second identifier vector from the third party server, the plurality of third parameters and the plurality of first parameters of a first type of parameter, the plurality of fourth parameters and the plurality of second parameters of a second type of parameter.

5. The method of claim 4, comprising:
receiving, by the data processing system, the second identifier vector, the first type of parameter including location identifiers and the second type of parameter including time stamps, the location identifiers and the time stamps each identifying a location and a time of a recorded interaction.

6. The method of claim 5, comprising:
determining, by the data processing system, the correlation count based on some of the plurality of first parameters being within a threshold distance of some of the plurality of third parameters and some of the plurality of second parameters being within a time window of some of the plurality of fourth parameters.

7. The method of claim 1, comprising:
transmitting, by the data processing system, the first identifier vector, some of the plurality of first parameters and some of the plurality of second parameters each including dummy data.

8. The method of claim 1, comprising:
transmitting, by the data processing system, the first identifier vector comprising the first identifier and a plurality of first combinations of the plurality of first parameters and the plurality of second parameters; and
receiving, by the data processing system, the second identifier vector comprising the second identifier and a plurality of second combinations of the plurality of third parameters and the plurality of fourth parameters.

9. The method of claim 1, comprising:
categorizing, by the data processing system, the plurality of first parameters into a plurality of first category values based on a respective value of the first parameter; and
transmitting, by the data processing system, the first identifier vector comprising the first identifier vector and the plurality of first category values.

10. The method of claim 1, comprising:
determining, by the data processing system, that a predefined time has passed since generating the one identifier key; and
deleting, by the data processing system, the first identifier vector and the second identifier vector, responsive to determining that the predefined that has passed.

11. A system for matching identifiers between multiple datasets, comprising:
a data processing system comprising one or more processors configured to:
transmit a first identifier vector to a third party server, the first identifier vector comprising a first identifier, a plurality of first parameters, and a plurality of second parameters;
receive from the third party server, the first identifier vector that was (i) encrypted based on a first-party encryption that is commutative and (ii) further encrypted by a third-party encryption associated with the third party server, the third-party encryption being commutative and different from the first-party encryption;
receive a second identifier vector, encrypted based on the third-party encryption associated with the third party server, the second identifier vector comprising a second identifier, a plurality of third parameters, and a plurality of fourth parameters;

encrypt the second identifier vector with the first-party encryption to generate an encrypted second identifier vector that is encrypted based on the third-party encryption and further encrypted based on the first-party encryption;

determine a correlation count between the encrypted first identifier vector and the encrypted second identifier vector based on a match between some of the plurality of first parameters and some of the plurality of third parameters of the encrypted first identifier vector, and between some of the plurality of second parameters and some of the plurality of fourth parameters of the encrypted second identifier vector;

determine that the first identifier corresponds to the second identifier based on the correlation count between the first identifier vector and the second identifier vector being above a determined threshold; and generate, responsive to determining that the first identifier corresponds to the second identifier, one identifier key for both the first identifier and the second identifier.

12. The system of claim 11, wherein the data processing system comprises an encryption module, the data processing system configured to:

encrypt the first identifier, the plurality of first parameters, and the plurality of second parameters based on the first-party encryption; and transmit the first identifier vector, responsive to encrypting the first identifier, the plurality of first parameters, and the plurality of second parameters based on the first party encryption.

13. The system of claim 12, wherein the one or more processors of the data processing system is further configured to:

encrypt the second identifier, the plurality of third parameters and the plurality of fourth parameters of the second identifier vector based on the first encryption; and determine the correlation count between the encrypted first identifier vector and encrypted second identifier vector, responsive to encrypting the second identifier, the plurality of third parameters, and the plurality of fourth parameters.

14. The system of claim 11, wherein the plurality of first parameters and the plurality of third parameters are a first type of parameter and the plurality of second parameters and the plurality of fourth parameters are a second type of parameter.

15. The system of claim 14, wherein the first type of parameter includes location identifiers and the second type of parameter includes time stamps, the location identifiers and the time stamps each identifying a location and a time of a recorded interaction.

16. The system of claim 15, comprising:

the data processing system configured to determine the correlation count based on some of the plurality of first parameters being within a threshold distance of some of the plurality of third parameters and some of the plurality of second parameters being within a time window of some of the plurality of fourth parameters.

17. The system of claim 11, wherein some of the plurality of first parameters and some of the plurality of second parameters each include dummy data.

18. The system of claim 11, wherein the first identifier vector comprises the first identifier and a plurality of first combinations of the plurality of first parameters and the plurality of second parameters and wherein the second identifier vector comprises the second identifier and a plurality of second combinations of the plurality of third parameters and the plurality of fourth parameters.

19. The system of claim 11, comprising:

the data processing system is configured to categorize the plurality of first parameters into a plurality of first category values based on a respective value of the first parameter and to transmit the first identifier vector comprising the first identifier vector and the plurality of first category values.

20. The system of claim 11, comprising:

the data processing system is configured to determine that a predefined time has passed since generating the one identifier key and delete the first identifier vector and the second identifier vector, responsive to determining that the predefined that has passed.

* * * * *